(12) United States Patent
Kumakura

(10) Patent No.: US 7,117,252 B1
(45) Date of Patent: Oct. 3, 2006

(54) DATA TRANSMISSION METHOD, COMPUTER-READABLE MEDIUM, AND DATA TRANSMISSION APPARATUS

(75) Inventor: Jiro Kumakura, Osaka (JP)

(73) Assignee: Digitaldesign Co., Ltd., Osaka (JP)

( * ) Notice: Subject to any disclaimer, the term of this patent is extended or adjusted under 35 U.S.C. 154(b) by 0 days.

(21) Appl. No.: 09/889,559

(22) PCT Filed: Jan. 28, 2000

(86) PCT No.: PCT/JP00/00505

§ 371 (c)(1),
(2), (4) Date: Jul. 27, 2001

(87) PCT Pub. No.: WO00/45274

PCT Pub. Date: Aug. 3, 2000

(30) Foreign Application Priority Data

Jan. 29, 1999 (JP) ................................ 11-022481

(51) Int. Cl.
G06F 15/16 (2006.01)
G06F 7/00 (2006.01)
(52) U.S. Cl. .................. 709/217; 709/203; 707/10
(58) Field of Classification Search .............. 707/1, 707/10, 101; 709/201, 206, 216–219, 231–232, 709/203

See application file for complete search history.

(56) References Cited

U.S. PATENT DOCUMENTS

| | | | | |
|---|---|---|---|---|
| 5,406,280 A | * | 4/1995 | Cogan et al. .................. 341/51 |
| 5,721,904 A | * | 2/1998 | Ito et al. ........................ 707/8 |
| 5,862,325 A | * | 1/1999 | Reed et al. .................. 709/201 |
| 5,873,086 A | * | 2/1999 | Fujii et al. .................... 707/10 |
| 5,884,325 A | * | 3/1999 | Bauer et al. ................ 707/201 |
| 5,926,816 A | * | 7/1999 | Bauer et al. .................... 707/8 |
| 6,151,602 A | * | 11/2000 | Hejlsberg et al. ............. 707/10 |

FOREIGN PATENT DOCUMENTS

| | | |
|---|---|---|
| DE | 197 25 264 | 10/1998 |
| JP | 64-070852 | 3/1989 |
| JP | 03-00585 | 1/1991 |
| JP | 04-054021 | 2/1992 |
| JP | 04-178771 | 6/1992 |
| JP | 05-035620 | 2/1993 |
| JP | 05-073449 | 3/1993 |
| JP | 05-225015 | 9/1993 |
| JP | 07-230404 | 8/1995 |

(Continued)

OTHER PUBLICATIONS

Office Communication from the Japanese Patent Office for Application No. 2000-019919 dated Dec. 25, 2003 and English language translation.

*Primary Examiner*—Ario Etienne
*Assistant Examiner*—Yasin Barqadle
(74) *Attorney, Agent, or Firm*—Westerman,Hattori, Daniels&Adrian,LLP.

(57) ABSTRACT

A data transmission method includes the steps of generating a data characteristic table and a retrieval data table in a memory area on a server side (S102, S103); converting items of the tables into serial form and combining them to generate transmission data (S104); attaching control data corresponding to the characteristics of the transmission data (S108); transmitting the data to a client machine (S110); regenerating the data characteristic table and the retrieval data table in a memory area on the client side (S203); and reading predetermined data from the regenerated table (S204). This method increases the data transmission rate, decreases the response time, and increases the efficiency of use of the database.

17 Claims, 12 Drawing Sheets

FOREIGN PATENT DOCUMENTS

| | | |
|---|---|---|
| JP | 08-286889 | 11/1996 |
| JP | 08-321878 | 12/1996 |
| JP | 08-339273 | 12/1996 |
| JP | 09-198285 | 7/1997 |
| JP | 10-091554 | 4/1998 |
| JP | 10-303971 | 11/1998 |
| JP | 10-326290 | 12/1998 |

* cited by examiner

Data Characteristic Table

Retrieval Data Table

⌜Name of Item Data Type Augments Code ｖａｒｃｈａｒ（５） ｎｏｔｎｕｌｌ Family Name ｖａｒｃｈａｒ（２０） ｎｕｌｌ First Name ｖａｒｃｈａｒ（２０） ｎｕｌｌ Telephone Number ｖａｒｃｈａｒ（２０） ｎｕｌｌＳ１０１Ｓ１０２Ｓ１０３Ｗｈｉｔｅ山田ＳｍｉｔｈＢｉｌｌ太郎Ｊｏｈｎ１２３－１２３４２３４－５６７８３４５－６７８９⌟ ～38

DATA TRANSMISSION METHOD, COMPUTER-READABLE MEDIUM, AND DATA TRANSMISSION APPARATUS

TECHNICAL FIELD

The present invention relates to a data transmission method. More specifically, the present invention relates to a data transmission method for a client machine and a database server linked via a network, in which data retrieval is made based on a retrieval command from the client machine, and the retrieved data is transmitted from the database server to the client machine.

BACKGROUND ART

A database server configured for retrieval through a network comprises a computer incorporating a high-speed CPU provided with a high-capacity storage device, a network operation system and application software dedicated to database server operation. To this database server, a clienat machine is connected via the network. The clienant machine issues a retrieval command via the network, upon which retrieval is made in the database server. A retrieval result data is then transmitted to the client machine via the network.

For extensive use of the database, the database server is connected with a multiple number of client machines via a wide-area network such as Internet, a LAN in a company, and so on. The connection of the client machines and the database server with Internet can be provided by a telephone link, as well as high-speed digital data transmission link, dedicated communication link, and so on. TCP/IP communication protocol is used as the world standard for the information exchange.

Kind of data retrieved in the database is very extensive, and so are attributes of the data retrieved. Information retrieved from the database takes a form of a table, in which a number of data is arranged in a matrix. The table is made up of a number of rows having a same structure. Each of the rows represents a unit of information, serving as a minimum unit of the result of retrieval in the database. Each of the rows contains items, and the item represents a minimum unit of information handled by the database.

When the result of retrieval obtained by the server side is transmitted to the client machine, a cycle of transmitting operation is performed for each item or row. This means that a huge amount of time must be spent for the transmitting procedure if the retrieved data includes a large number of rows.

There is another problem when the data is transmitted via a general-purpose network such as Internet. Specifically, the link is shared by other users, which means a long transmission time is required if the link is being used by a large number of users. The transmission time can be longer if the communication link has a narrow bandwidth, making impossible to use the database efficiently. For these reasons, very often, the retrieval speed decreases very unfavorably via a public link such as Internet, even if the same data retrieval can be performed at a very high speed on an in-house LAN.

An invention disclosed in the Japanese Patent laid-Open No. 8-286889 proposes a data transmission method, in which only a difference contained in an intended data is transmitted, and the client machine restores the intended data from a previously transmitted data and the difference data.

Further, an invention disclosed in the Japanese Patent laid-Open No. 9-198285 proposes an arrangement, in which access operation from the client machine to the database on the server and transmission operation of data other than the database data are performed by using a same language and interface as used in execution of functions uniquely incorporated in an application software as the subject of development.

Data retrieved from the database is very extensive. In addition, attribute of retrieved data and size of the retrieval data table are different every time the retrieval is made. Therefore, the data transmission method in which a predetermined data table format is stored in the client machine and only a difference data contained in an intended data is transmitted does not have general applicability. Further, the data retrieved in accordance with the retrieval command must eventually be transmitted in its entirety. Therefore, the data transmission method disclosed in the first Gazette can not increase data transmission speed.

On the other hand, the invention disclosed in the second Gazette aims at improving transmission efficiency by rationalizing the way in which the database is used. In other words, nothing has been changed in the method of data transmission, configuration of the data to be transmitted, and so on. Therefore, there is no improvement in data transmission speed itself, and the data transmission speed can be decreased dramatically depending upon a condition of the communication link.

DISCLOSURE OF THE INVENTION

The present invention can increase transmission speed of the data retrieved by the database, in the conventional communication environment, and further can decrease response time in the use of database, thereby increasing efficiency in the use of database.

The present invention relates to a data transmission method between a server incorporating a database therein and a client machine interlinked via a network in which data retrieved from the database based on a retrieval command from the client machine is transmitted from the database server to the client machine. The data transmission method according to the present invention comprises: a data table generating step of generating a retrieval data table containing the retrieved data and a data attribute table containing attribute information of the retrieved data, in a memory area on a server side; a transmission data generating step of serializing all items contained in the data attribute table and retrieval data table into a single string; a control information adding step of adding control information corresponding to the transmission data, to a head of the transmission data; a data transmitting step of transmitting the transmission data generated in the transmission data generating step, to the client machine; a data table regenerating step of regenerating the data attribute table and the retrieval data table in a memory area on the client side, from the transmission data transmitted; and a data reading step of reading required data from the regenerated data attribute table and retrieval data table.

The present invention converts data to be transmitted into a form which can simplify a transmission procedure in the communication link. Further, by transmitting the converted data in a compressed form, the transmission speed can be further increased.

According to the present invention, a result of retrieval is first stored in a memory area on the database server side. Because of remarkable improvement in recent years in the performance of computers and peripherals used in the server, it is now very easy to provide a large memory area. In addition, data transmission speed in a server machine or between a server and a peripheral is remarkably higher than via a communication link. Therefore, storing the retrieval data tentatively in the server-side memory area gives very little negative influence on retrieval speed. It should be noted here that the memory area on the server side includes not only the memory area in the server but also the memory area in the peripherals.

The retrieval data table described above is a table containing real data retrieved from the database based on a retrieval command. The data attribute table is a table that stores data describing an attribute of the retrieved data. The data attribute table includes such items as title, data type and argument, corresponding to the retrieved data.

There is no specific limitation to a method for generating the retrieval data table and the data attribute table. Thus, a conventional method for storing a retrieval data into a storing device such as a memory can be employed.

The serialization of the data performed in the transmission data generating step is achieved by converting all of the items included in each of the data attribute table and the retrieval data table into a single, continuous string of data. For example, if the table is made of three rows, character strings for example in all of the items in each row are connected into a single string, and then the string made from an upper row has its rear end connected by the front end of the string made from a lower row and so on. No code is inserted for row identification between the two mutually connected rows. In addition to the data serialization for each of the tables, the serialized data from the data attribute table and the serialized data from the retrieval data table are connected together. Again, there is no specific need at all for insertion of any identification information between the serialized data string made from the data attribute table and the serialized data string made from the retrieval data table. However, any identification information may be inserted depending on the attribute of the retrieval data.

The transmission data generating step converts a number of data included in the tables into a single string of data. If all of the items in the retrieval data table are provided by text data, the resulting transmission data is a single string of text characters. If any of the items in the retrieval data table includes information other than the text data such as an image data, this image data item can also be treated in the same manner as the text data, and can be converted into a single string of data.

Next, the control information adding step of adding control information corresponding to the transmission data is performed.

Size, items and so on of the retrieval data table are different every time the retrieval is made. Therefore, information on these characteristics must be sent to the client machine in order to regenerate the tables from the transmission data which is sent in the form of the single string. For this reason, the control information in accordance with the characteristic of the transmission data is added to the head of the transmission data. Examples of the control information include size of the transmission data, whether or not the data is compressed, means for the compression, and size of the data when decompressed. The control information can also include information for handling such cases as a problem encountered during the retrieval, and no matching found in the retrieval. Adding these pieces of control information enables the receiving side to quickly reserve a necessary size of memory area for example, facilitating smooth transmission of the data.

The transmission data and the control information are outputted to the communication link via information sending means operating on TCP/IP protocol for example, and then received by the client machine. Since the transmission data can be sent in a single cycle of procedure as one complete string data, dramatic reduction can be achieved in the transmission time as compared with the conventional data transmission method.

The client machine receives the transmission data via a receiving means. Then, the data table regenerating step of regenerating the data attribute table and the retrieval data table in a memory area on the client side, from the transmission data transmitted is performed. It should be noted here that the memory area in the client machine includes not only the memory area in the client machine but also the memory area in the peripherals.

From these data attribute table and the retrieval data table thus regenerated in the client machine, desired retrieval data is read out. Here again, storing the transmitted data first in a memory area in the clienat machine gives very little negative influence on the retrieval speed, for the same reason as described for the server.

The data transmission method according to the present invention enables the database retrieval to be performed without changing the conventional method of retrieval, means of communications, and so on. Therefore, there is no need for changing the retrieval method or altering the hardware configuration. Further, the operator working on the client machine can continue with exactly the same operation as in the conventional database retrieval.

The invention disclosed in claim 2 of the present application includes: a data compressing step on the server side, of compressing the serialized transmission data and including information on a method of the compression in the control information; and a data decompressing step on the client side, of decompressing the received data for generation of the transmission data.

Since the transmission data is a string data, the data can be easily compressed by using a known compressing method. Thus, the amount of the transmission data itself can be reduced, and the transmission time can be further shortened.

The invention disclosed in claim 3 of the present application includes: a compression determining step of determining whether or not the transmission data is to be compressed, in accordance with the data characteristic of the transmission data; and a data compressing step of compressing the transmission data and including information on a method of the compression in the control information, if the compression determining step determines for the compression.

The data may not have to be compressed, depending on the result of retrieval. Also, the compression can take a long time depending on the character of the data. In such cases as these, the response time can be made shorter by making transmission without compressing the data. As another consideration, an optimum method of compression should be applied in accordance with the characteristic, size and so on of the data. According to the present invention, a characteristic of the transmission data is analyzed, and determination is made on the need for the compression and the method of compression. Whether or not compression is made, and by what means the data is compressed are characteristics of the transmission data itself, and information on these characteristics are sent to the client machine as part of the control information.

The invention disclosed in claim 4 of the present application is a variation applied to a case in which all of the items contained in the data table and the data attribute table are provided by text data. The text data may be whatever recognizable and transmittable by the computer as text data, i.e. character/symbol information. The text data includes not only letters and characters such as alphabets and Chinese characters but also mathematical figures and other symbols as well as comma, etc. Further, the present application can be applicable to text data in a variety of languages.

According to the present invention, elements in each item of the retrieval data table are simply serialized regardless of their meaning, type and so on, into a text data string for transmission. For example, even if the item contains a figure representing an amount or date, the figure is simply recognized as a character string and serialized as it is. Since the data attribute table also consists of text, the resulting transmission data is one piece of data that is a single string of the integrated text, which is then transmitted in only one transmitting procedure. This dramatically shortens the transmission time.

The invention disclosed in claim 5 of the present application is a variation in which an item in the retrieval data table extracted from the database contains data other than text data. The database can store not only text information but also image and sound information. This invention is an application of the present invention to a database that stores data other than the text data. According to this invention, a compression method can be selected in accordance with the transmission data, and therefore the retrieval data table containing such a data as an image data can be transmitted efficiently.

The invention disclosed in claim 6 of the present application comprises: a retrieval command data generating step performed in the clienat machine, of generating a serialized retrieval command; and a retrieval command data transmitting step of transmitting the retrieval command data to the server; and a retrieval command regenerating step performed on the server side, of converting the retrieval command data into a retrieval command that performs the database retrieval.

Even if the database retrieval command for example is short, the transmission time can be long due to a large number of transmission procedures if the transmission is made while recognizing each row of the retrieval command. According to the present invention, the retrieval instructions such as the retrieval command is serialized in the same way as in the transmission of the retrieval data table. The above serializing means performs the serialization in the same manner as in the serialization of the retrieval data table disclosed in claim 1 to claim 5, so are the addition of the control information and the compression as needed, and the transmission.

The invention disclosed in claim 7 of the present application is a database retrieval method in which retrieval commands from a plurality of client machines are transmitted via the micro server, whereas results of the retrieval is forwarded to each of the relevant client machines via the micro server. By sharing one micro server among the client machines, cost for introduction can be reduced. Each of the client machines can make database retrieval in exactly the same procedure as before. Further, this invention is effective in a case where high-speed data communication can be enjoyed between client machines linked via a LAN but transmission speed is lowered once the client machines are connected with a remote database via a communication link.

The invention disclosed in claim 8 of the present application is a database retrieval method wherein the micro server generates and forwards a serialized retrieval command data made from the retrieval command sent by the client machine, and the main server converts the forwarded retrieval command data into a retrieval command thereby executing the database retrieval.

The invention disclosed in claim 9 of the present application is an application of the present invention to data transmission between a plurality of database servers. There is already a database working on the concept of distributed processing, in which a plurality of database servers are interconnected via a network such as Internet, for the purpose of decentralized processing. In data transmission between these database servers, not only normal database retrievals are made but also many kinds of other operations such as data sharing and data updating are performed, resulting in a huge amount of data transmission. Therefore, the data transmission system according to the present invention can remarkably increase data transmission efficiency.

The inventions disclosed in claim 10 to claim 14 of the present application relates to a computer-readable recording medium storing a transmission data processing program installable to a server and a client machine of a conventional database retrieval system.

The data transmission method according to the present invention can be easily executed by installing the transmission data processing program to a server and a client machine in a conventional database retrieval system or a micro server such as the one disclosed in claim 7.

The above computer-readable recording medium includes one containing a program for the client machine only, one containing a program for the database server only, and one containing a program applicable to both of the server and the client machine. Further, the recording medium may store programs applicable to a variety of means and apparatuses included in the present invention, for selected installation.

The invention disclosed in claim 11 of the present application is applicable to a case in which data transmission is made via a special communication means not incorporated in the server and so on as a standard.

The inventions disclosed in claim 15 to claim 17 of the present application relates to a data transmission apparatus comprising a pair of independent micro servers transmitting data to and from each other.

By providing one of these micro servers on the client side and the other on the database server side, the data transmission method according to the present invention can be embodied without increasing burden placed on the client machine nor on the database server. Further, the micro server on the client side can be connected with a plurality of clienant machines, and the micro server on the database server side can be connected with a plurality of database servers.

There is no specific limitation to the communications link between the micro servers, between the micro server and the database server, and between the client machine and the client-side micro server. For example, the data transmission between the micro servers may be via a wide-area network such as Internet, whereas the data transmission between the client-side micro server and each of the client machines may be via a LAN. Further, effect of the invention can be expected even in a case where all the relevant apparatuses are linked via Internet. For example, the invention is effective in a case in which there is no problem in data transmission in a domestic network but communication link for transmitting data to a foreign country has a narrow bandwidth.

There is no specific limitation to the kind and configuration of the database covered by the present invention, and the present invention can be applied to a variety of databases capable of extracting data based on a retrieval command from the cleinat machine.

Further, the present invention is not limited by a database access operation executing function on the server or a coding language therefor. Thus, the present invention is applicable to a variety of database servers operated by different functions and languages.

BEST MODE FOR CARRYING OUT THE INVENTION

The present embodiment is realized by incorporating the data transmission method according to the present invention, as a middleware, in a conventional database system.

A middleware, in general, is a piece of software for facilitating efficient utilization of functions provided by operation system software, or providing support in software development. According to the present embodiment, retrieval processing means in the database itself is provided by one based on a conventional SQL language. Further, the database system includes a server incorporating a database therein, a plurality of clienant machines connected to the server via a digital communication link and Internet, interfaced by a data reception-transmission processing means based on the TCP/IP protocol.

Figure 1:
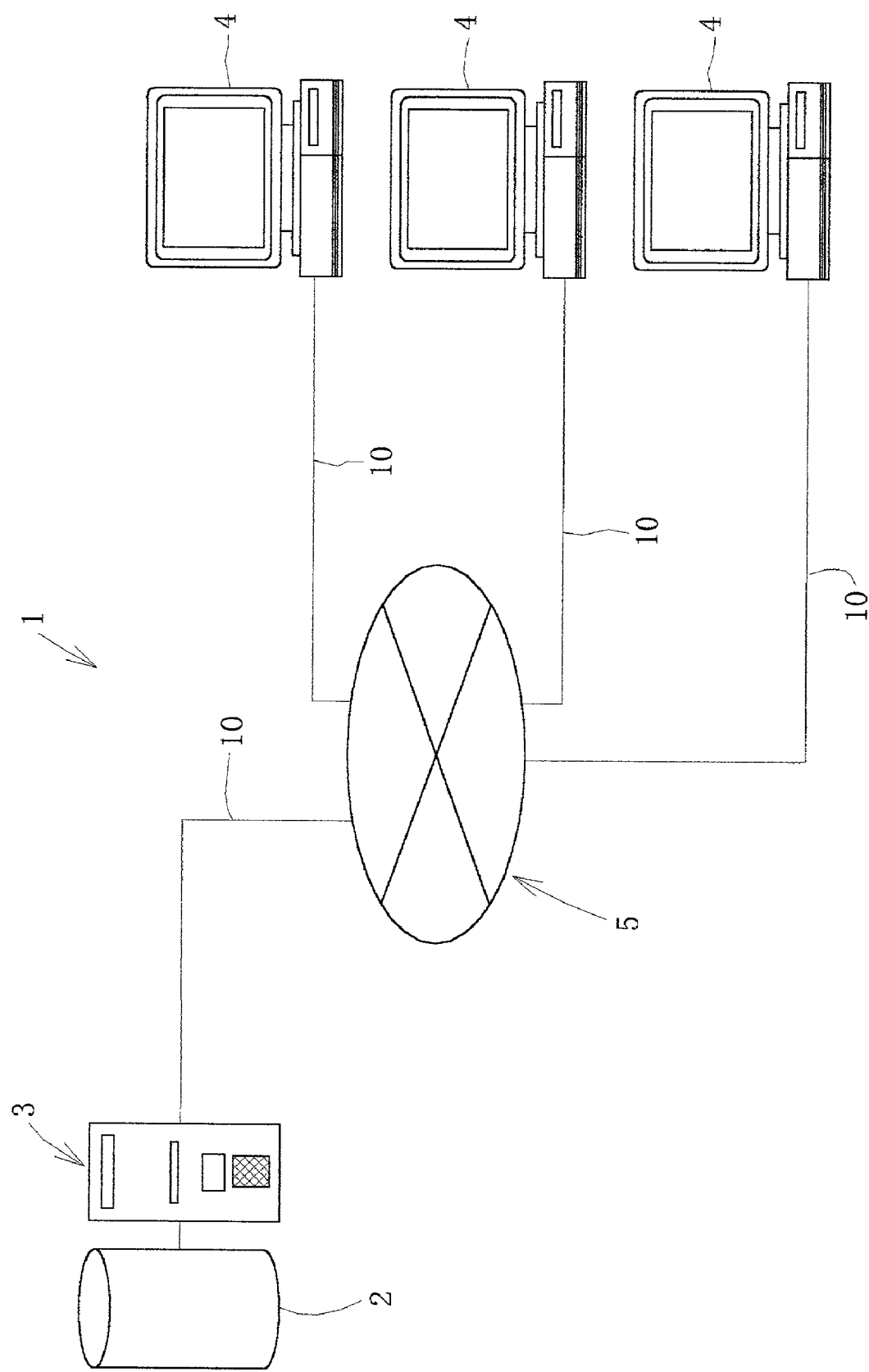
FIG. 1 is a diagram of a first embodiment of the present invention, showing a hardware configuration of a database retrieval system.

FIG. 1 shows a hardware configuration of the database retrieval system. A database retrieval system 1 according to the present embodiment comprises a server 3 including a database 2, and a plurality of clienant machines 4 connected therewith via a network 5. The network 5 is provided by Internet, and a dedicated digital link 10 provides access to Internet.

According to the present embodiment, a retrieval command from the client machine 4 is sent to the server 3 via the digital link 10 and Internet 5. The server 3 performs database retrieval based on the retrieval command. A result of the retrieval is transmitted to the client machine 4 via the digital communication link 10 and Internet 5.

Figure 2:
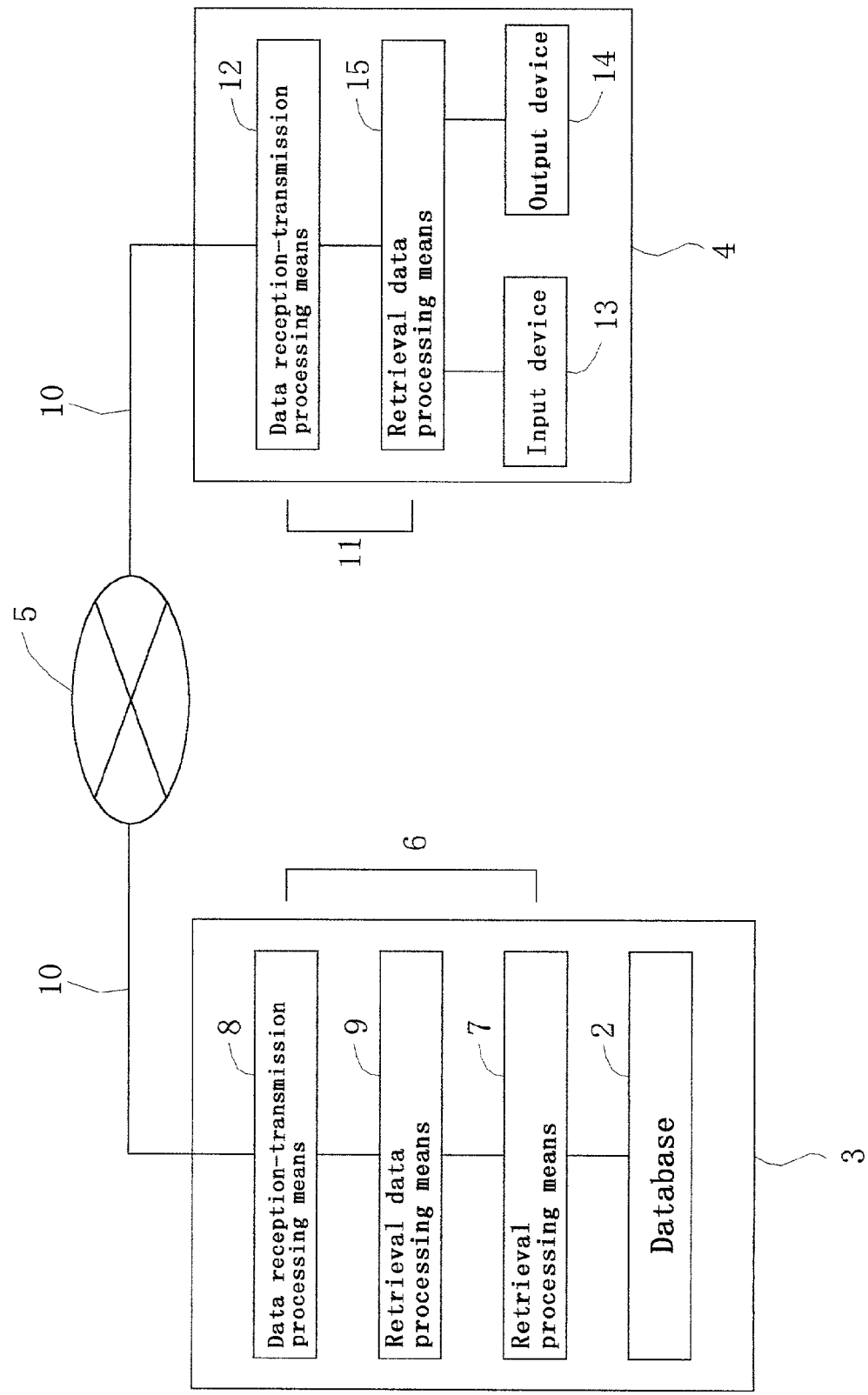
FIG. 2 is a block diagram of a data processing portion provided on a server side and on a client side in FIG. 1.

As shown in FIG. 2, the server 3 and the client machine 4 are provided with a data processing portion 6 and 11 respectively.

The data processing portion 6 on the server side includes retrieval processing means 7 that performs retrieval based on a retrieval command, data reception-transmission processing means 8 that transmits data extracted by the retrieval processing means 7 to the client machine 4 as well as receiving the retrieval command and so on sent from the clienant machine, and retrieval data processing means 9 that is provided between the retrieval processing means 7 and the data reception-transmission processing means 8, converts the retrieved data or the received data into a predetermined format, and forwards the converted data to the retrieval processing means 7 or the data reception-transmission processing means 8.

The retrieval processing means 7 extracts, from the database 2, data that satisfies a condition defined by the retrieval command sent from the client machine, by means of a conventional retrieval processing method based on the SQL language.

The data reception-transmission processing means 8 transmits to the clienant machine 4 the retrieved data as converted by the retrieval data processing means 9, via the digital link 10 and Internet 5, as well as receiving and forwarding the retrieval command information from the clienant machine to the retrieval data processing means 9 or the retrieval processing means 7.

On the other hand, the data processing portion 11 on the clienant side includes data reception-transmission processing means 12 that is an equivalent of the data reception-transmission processing means 8 on the server side, and retrieval data processing means 15 that processes and forwards the retrieval command entered from an input machine 13, to the data reception-transmission processing means 12 as well as generating and outputting an output data based on the received retrieval command, to an output device 14 such as a display.

Figure 3:
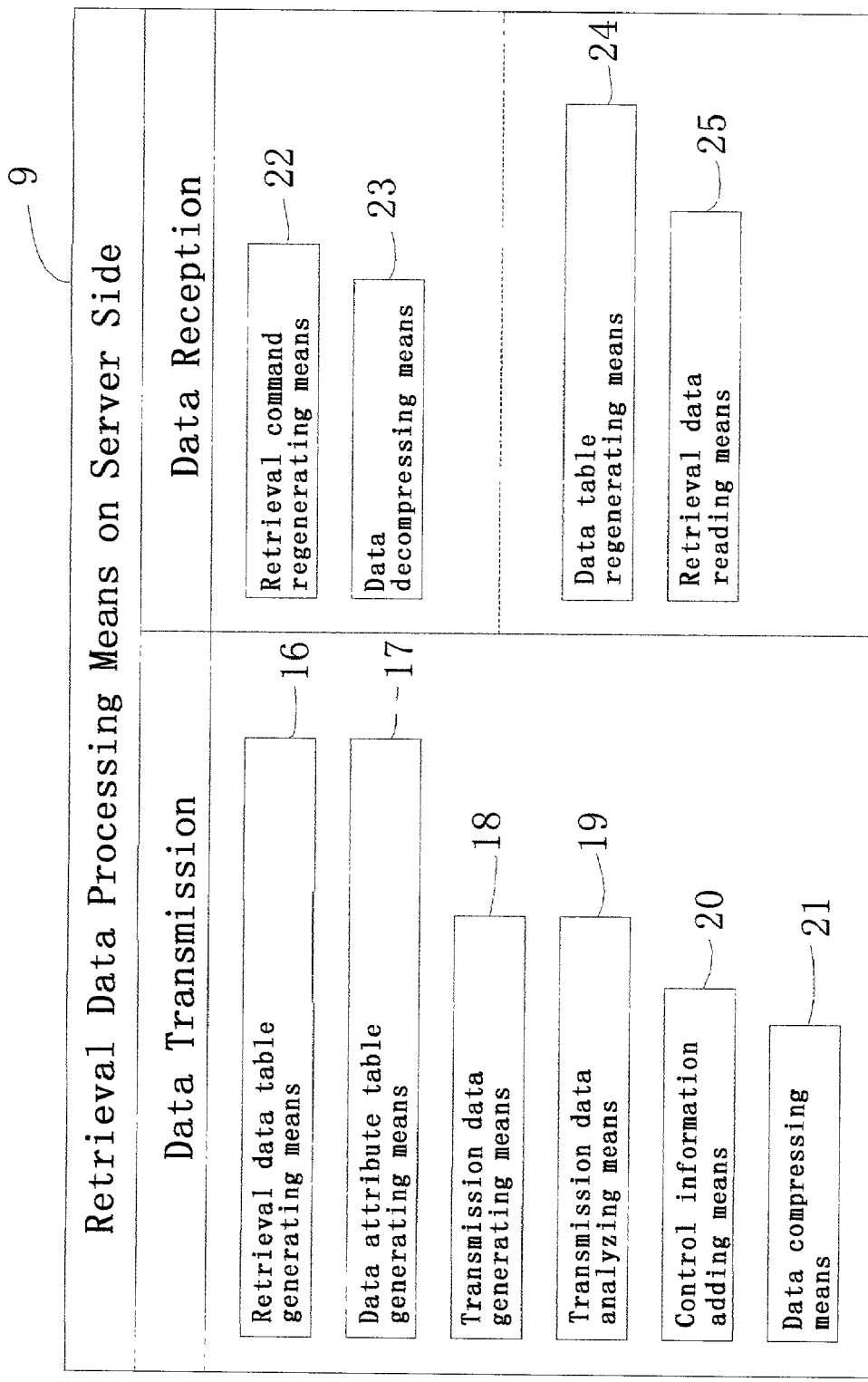
FIG. 3 is a block diagram of retrieval data processing means on the server side in FIG. 2.

FIG. 3 shows the retrieval data processing means 9 on the server side. The server-side retrieval data processing means 9 includes a plurality of data processing means, which can be classified in a data-transmission side or a data-reception side. Means on the data-transmission side include retrieval data table generating means 16, data attribute table generating means 17, transmission data generating means 18, transmission data analyzing means 19, control information adding means 20, and data compressing means 21. Means on the data-reception side include retrieval command regenerating means 22, data decompressing means 23, data table regenerating means 24, and retrieval data reading means 25.

Figure 4:
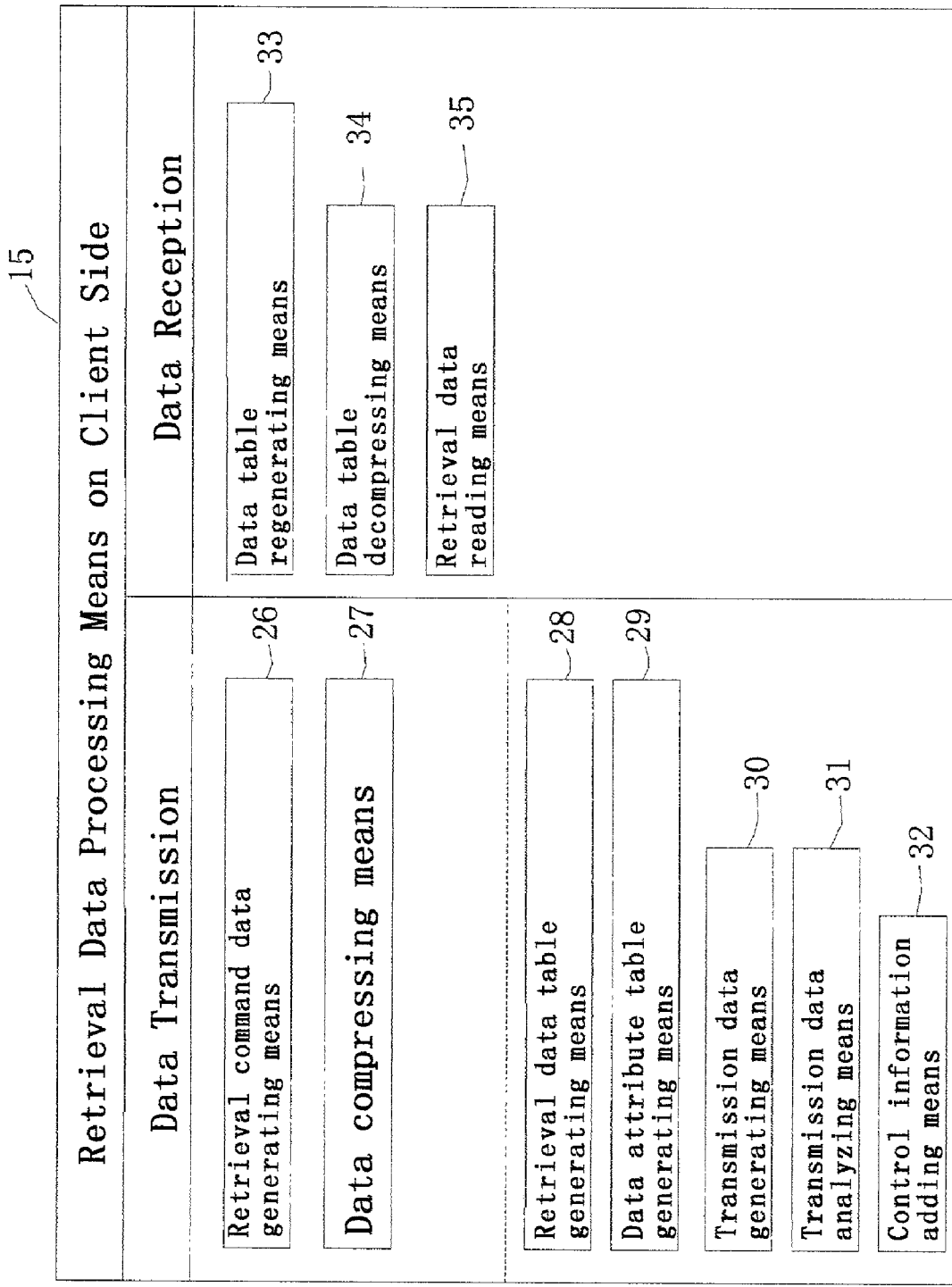
FIG. 4 a block diagram of retrieval data processing means on the client side in FIG. 2.

FIG. 4 shows the retrieval data processing means on the client side. Similarly to the counterpart on the server side, the client side retrieval data processing means 15 also includes a plurality of data processing means which can be classified in a data-transmission side or a data-reception side. Means on the data-transmission side include retrieval command data generating means 26, data compressing means 27, retrieval data table generating means 28, data attribute table generating means 29, transmission data generating means 30, transmission data analyzing means 31, and control information adding means 32. Means on the data-reception side include data table regenerating means 33, data decompressing means 34, and retrieval data reading means 35.

According to the present embodiment, in order to update the database, an updating data can be sent from the client machine 4 to the server 3. Out of the processing means on the client side, the retrieval data table generating means 28, the data attribute table generating means 29, the transmission data generating means 30, the transmission data analyzing means 31 and the control information adding means 32 serve for transmitting data from the client machine 4 to the server 3.

On the other hand, as shown in FIG. 3, in order to receive and process the data sent from the client side, the server side is provided with the data table regenerating means 24, and the retrieval data reading means 25.

Figure 5:
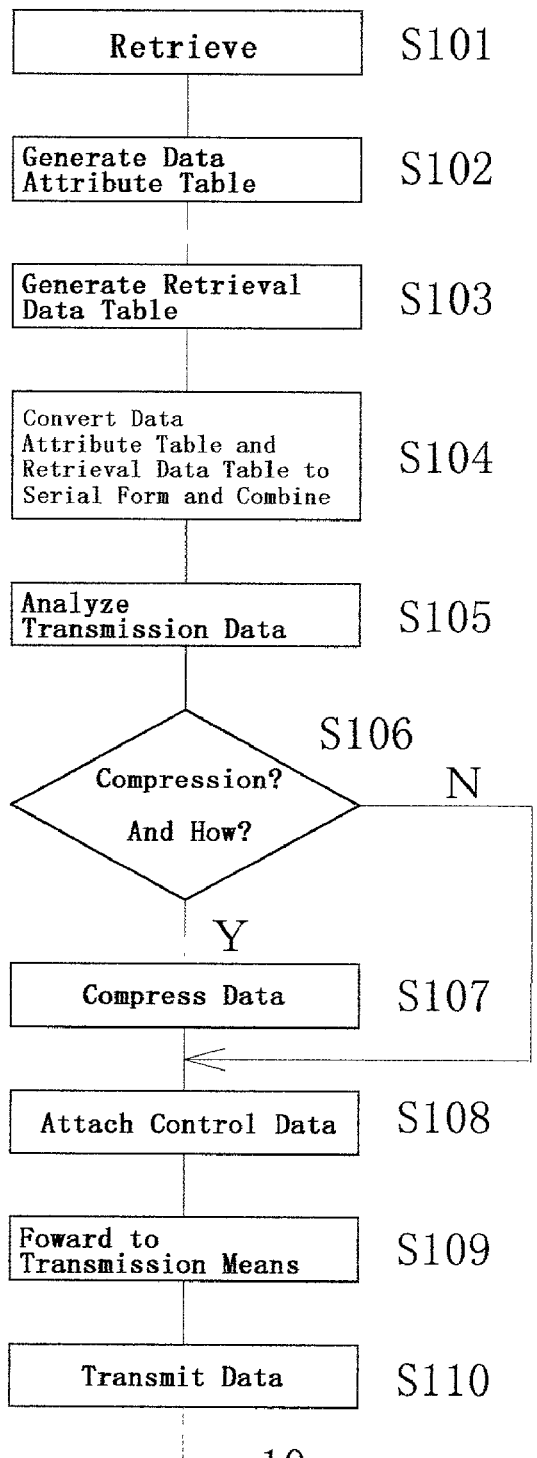
FIG. 5 is a flowchart showing a data processing procedure on the server side.
Figure 6:
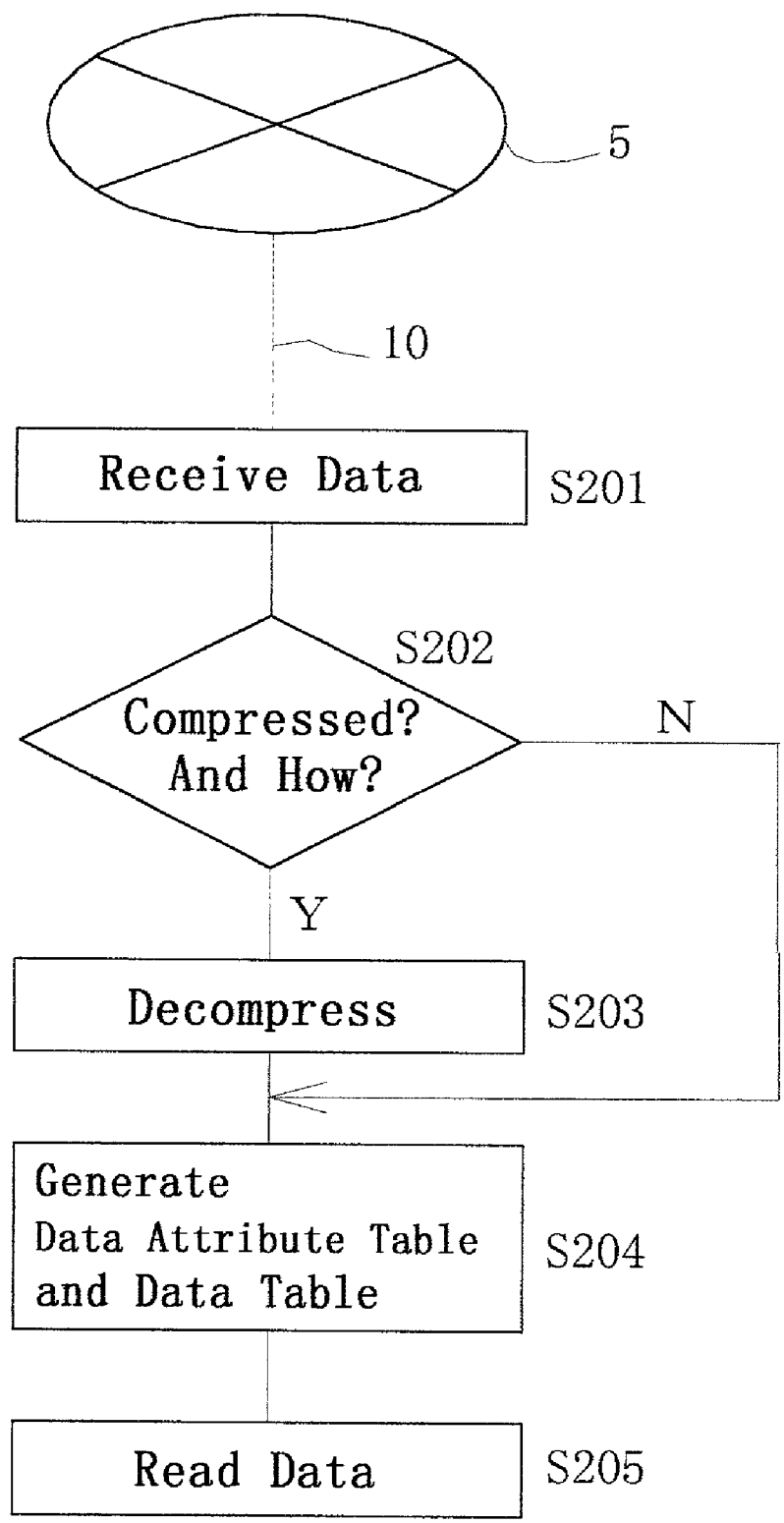
FIG. 6 is a flowchart showing a data processing procedure on the client side.

Now, each of the means in the retrieval data processing means 9 and 15 will be described sequentially in the order of data transmission. FIG. 5 and FIG. 6 show a transmission procedure of the retrieved data. Steps shown in these figures are those after a database retrieval step (S101). The database retrieval step (S101) is performed as conventionally.

A result of the retrieval performed by the retrieval processing means 7 is forwarded to the retrieval data processing means 9. The data attribute table generating means 17 generates a data attribute table, which is then stored in a memory area (S102). At the same time, the retrieval data table generating means 16 generates a retrieval data table, which is then stored in a memory area (S103). The generation of the data attribute table and the generation of the retrieved data may be made simultaneously or sequentially.

Figure 7:
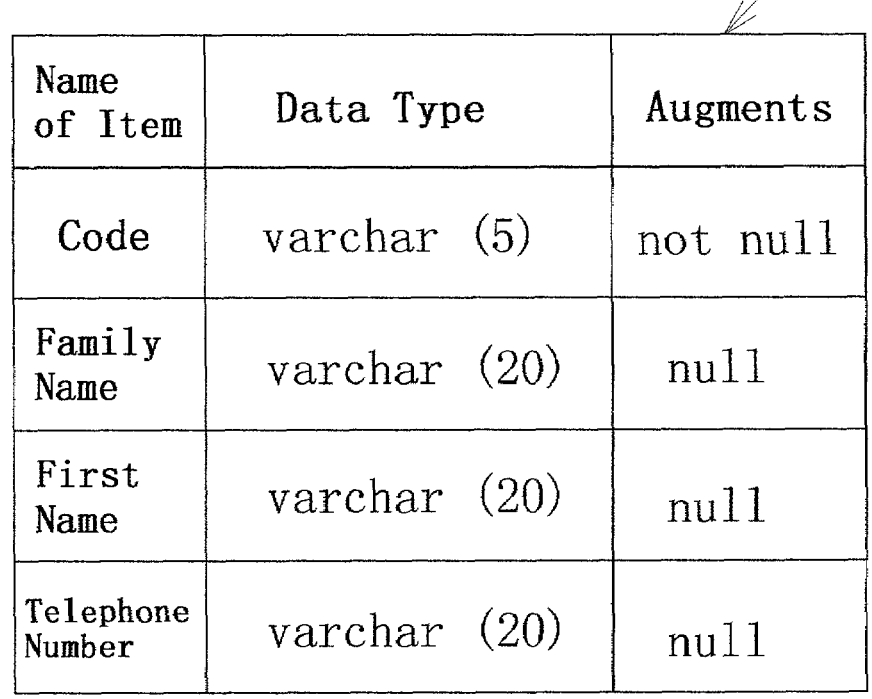
FIG. 7 shows an example of a data attribute table.
Figure 8:
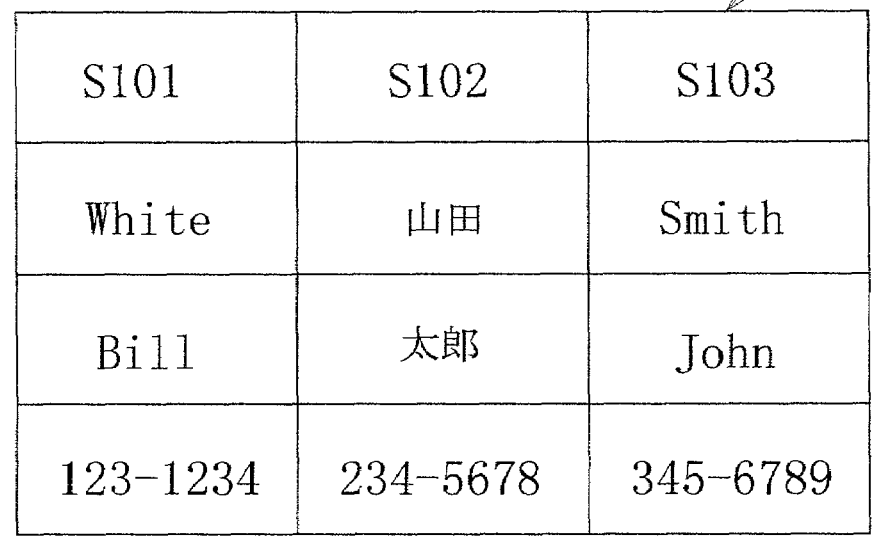
FIG. 8 shows an example of a retrieval data table.

FIG. 7 and FIG. 8 show an example of the data attribute table and the retrieval data table. A data attribute table 36 includes items each describing a data attribute of information placed in a corresponding item of a retrieval data table 37. It should be noted here that in the example in FIG. 7, information placed in each item is shown as a human-friendly character string, for a purpose of better understanding of the content and attribute of the data placed. In practice, however, an amount of data can be reduced by means of codes. For example, "not null" may be represented by "0", whereas "null" may be represented by "1" in the data attribute table 36.

Figures 9, 10:
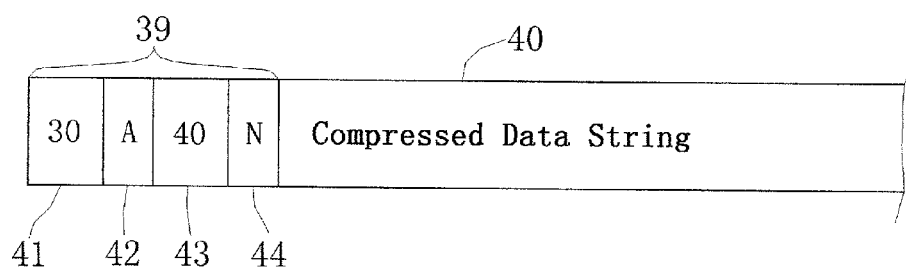
FIG. 9 shows an example of how a transmission data may look.
FIG. 10 shows an example of a data configuration of a compressed transmission data accompanied by control information.

Next, the transmission data generating means 18 connects information in all of the items of the data attribute table 36 and the retrieval data table 37 into serial form, thereby generating a transmission data (S104). FIG. 9 shows an example of the transmission data 38 as generated from the data tables shown in FIG. 7 and FIG. 8. As exemplified in this drawing, information contained in each item of each row of the data attribute table 36 and the retrieval data table 37 is simply connected into a single string of a text data. Note that although the example text data in FIG. 9 is printed as a four-row data due to document space restriction, the data is a single string of serial data in the server. Note further, that although the data in the present embodiment is a combination of Roman letters, Chinese characters, and Arabic figures, there is no limitation to the language that forms the text data, and thus the text data may be of another kind.

The transmission data 38 is analyzed by the transmission data analyzing means 19 for its characteristic, determination is made on such aspects as whether or not the data should be compressed, size of the data, and decompressed size if the data is to be compressed, and control information 39 is obtained (S105).

Thereafter, if it is determined that the data should be compressed, the data compressing means 21 compresses the transmission data 38, thereby reducing the size of the data (S107). Then, as shown in FIG. 10, the control information adding means 20 adds the control information 39 to the head of a compressed transmission data 40 (S108).

According to the present embodiment, the control information includes data size 41, method of compression 42, size of decompressed data 43, and a return code 44 that indicates a failed retrieval for example.

The data to which the control information 39 is added is then forwarded to the data reception-transmission processing means 8 (S109), and then transmitted to the client machine 4 in accordance with the TCP/IP protocol, as a single string of data (S110).

Because the transmission data 9 is a single string of characters, the transmission only takes one cycle of transmission procedure, making possible to dramatically reduce the transmission time.

FIG. 6 shows a processing procedure of received data on the clienat side. The data sent from the server 3 is received by the data reception-transmission processing means 12 of the client machine 4 (S201). The control information of the received data is read to determine if there is need for decompression (S202). If the data is compressed, the data decompressing means 34 restores the string data 38 shown in FIG. 9 (S203).

Next, the data attribute table 36 and the retrieval data table 37 shown in FIG. 7 and FIG. 8 are separated from the data string 38 and stored in a memory area of the client machine by the data table regenerating means 33 (S204). With the above procedure, the same data as retrieved in the server is formed in the client machine.

Then, by using the retrieval data reading means 35, desired data from the data attribute table 36 and the retrieval data table 37 in the client machine 4 can be outputted to an output device such as a display and a printer (S205).

According to the present embodiment, the retrieval command transmitted from the client side is sent to the server 3, as a serialized retrieval data. For this reason, as shown in FIG. 4, the client side is provided with the retrieval command data generating means 26 and the data compressing means 27, so that the retrieval command and so on is transmitted as a compressed single-string serial data for execution of the retrieval. On the other hand, the retrieval data processing means 9 on the server side is provided with the data decompressing means 23 that decompresses the above-described compressed retrieval command, and the command regenerating means 22 that reproduces the retrieval command data from the serialized data string. The retrieval command reproduced by the command regenerating means 22 is forwarded to the retrieval processing means 7 for execution of the database retrieval.

Further, a data in a table format can be sent from the client side, to update data in the database 2. Specifically, as shown in FIG. 4, the retrieval data processing means 15 on the client side includes the same retrieval data table generating means 28, data attribute table generating means 29, transmission data generating means 30, transmission data analyzing means 31 and control information adding means 32 as provided on the server side. On the other hand, the retrieval data processing means 9 on the server side includes the data table regenerating means 24 and the retrieval data reading means 25.

With the arrangement described above, when database data is updated from the client side, dramatic reduction in the transmission time for the updating data can be realized.

Figure 11:
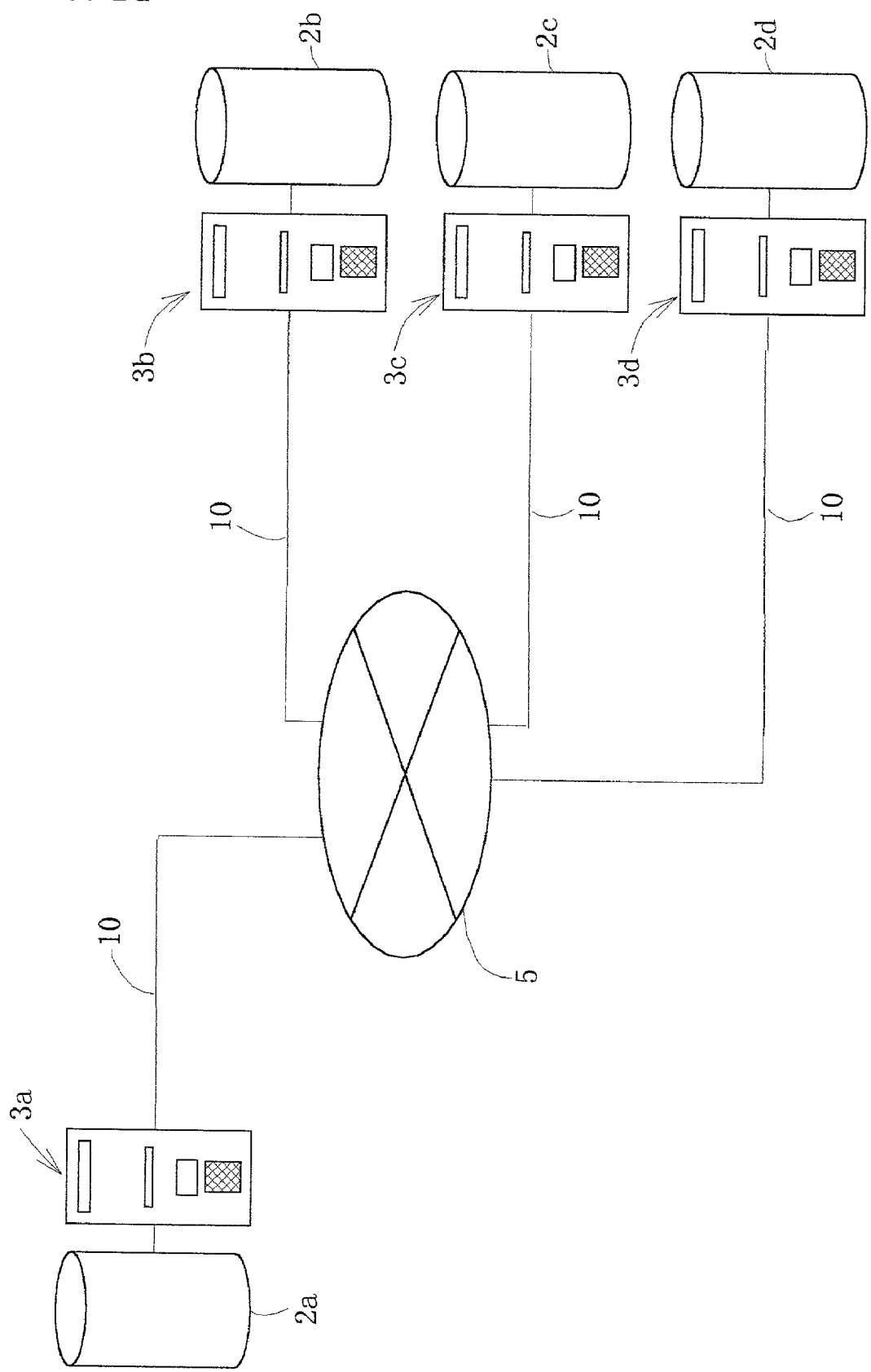
FIG. 11 is a diagram of a second embodiment of the present invention, showing a hardware configuration for data transmission among a plurality of servers each incorporating a database.

FIG. 11 shows a second embodiment of the present invention. The figure shows a hardware configuration for a case in which a plurality of servers 3a to 3d including databases 2a to 2d respectively are connected via a communication link 10 and Internet 5 for data transmission among these servers.

Each of the servers 3a to 3d has data processing means that includes, as in the embodiment described above, the data processing means including each of the means shown in FIG. 3 and FIG. 4, and data exchange among the servers is made by means of the serialized data.

Figure 12:
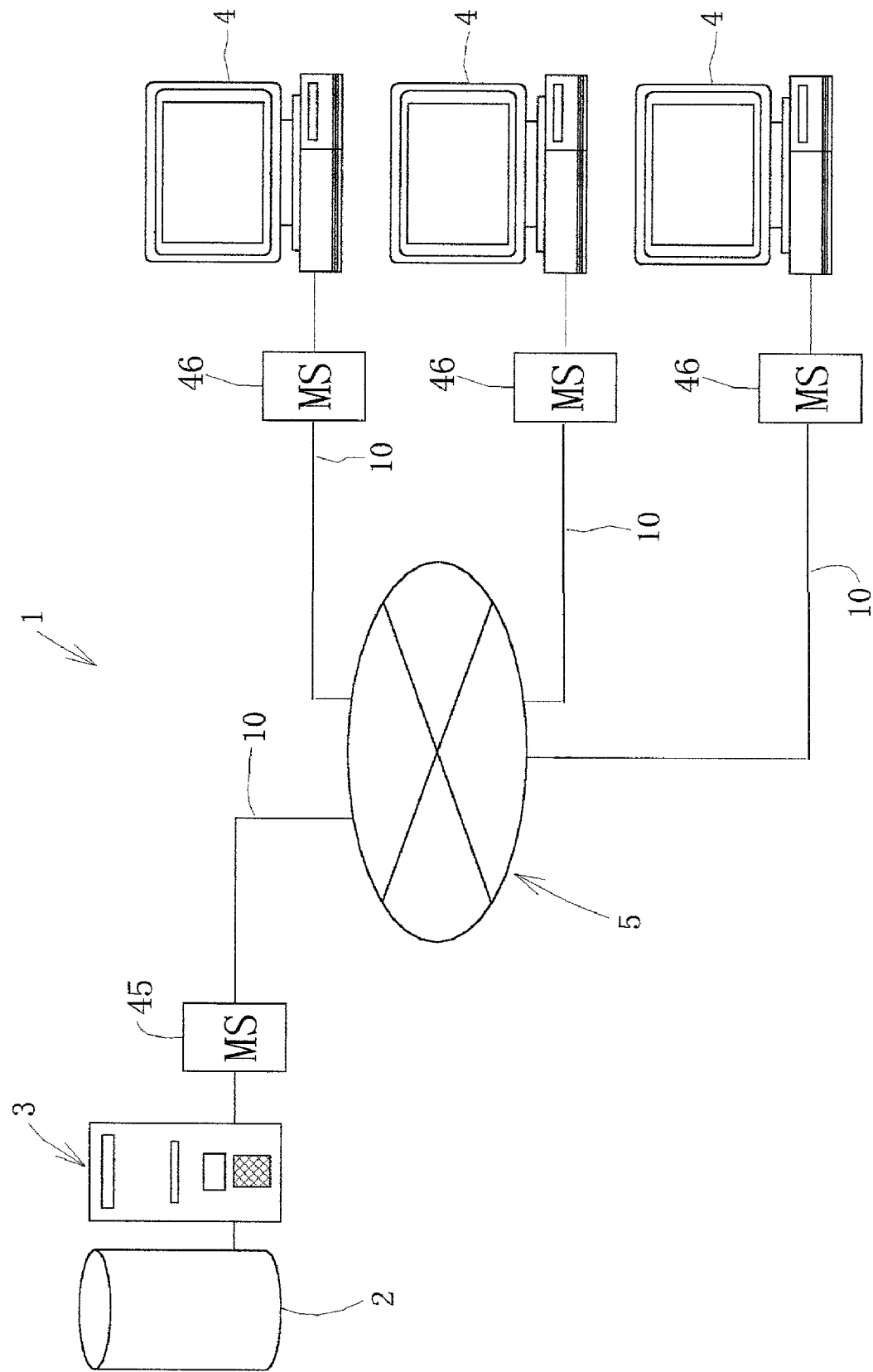
FIG. 12 is a diagram of a third embodiment of the present invention.
Figure 13:
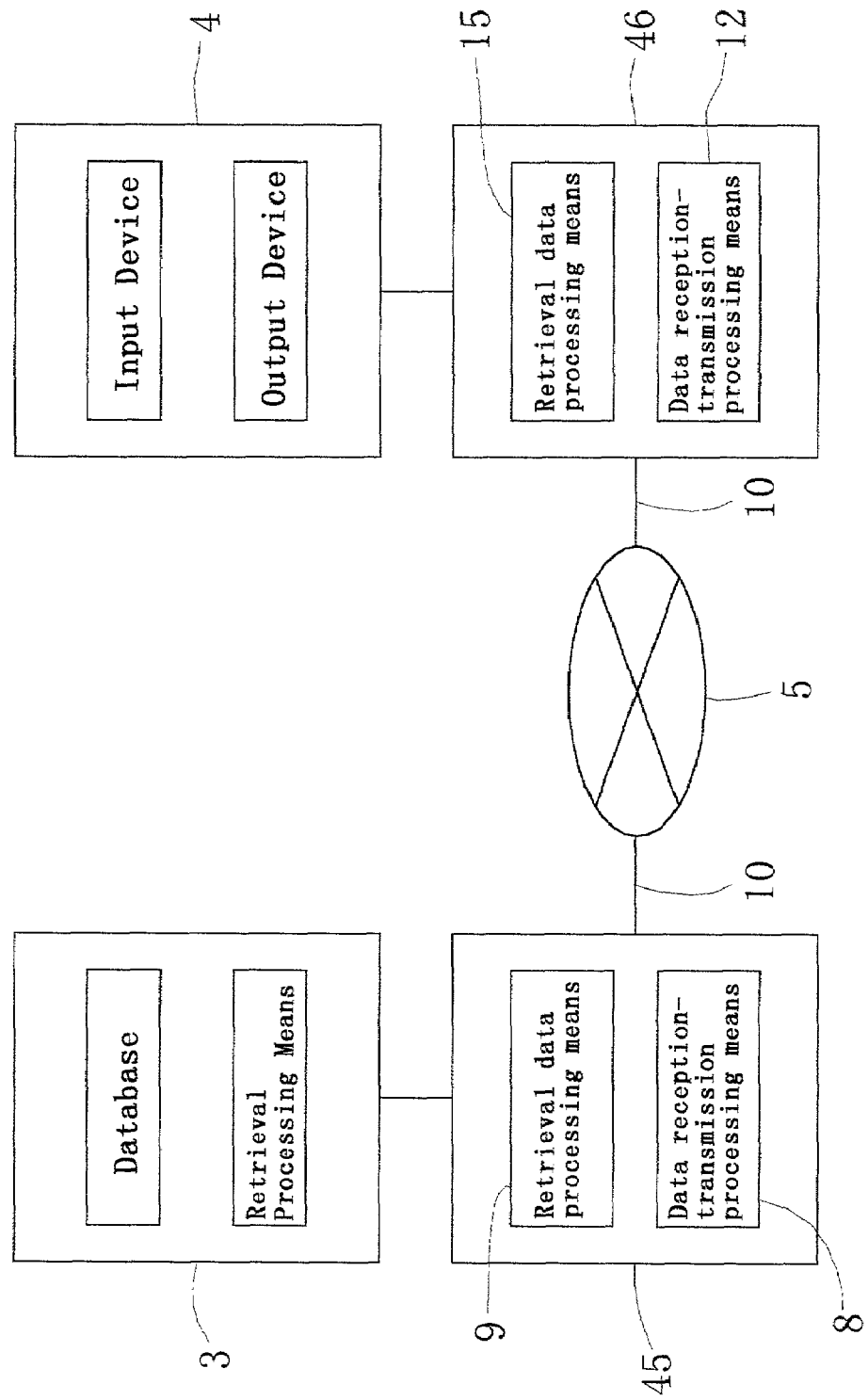
FIG. 13 is a block diagram showing function of the embodiment in FIG. 12.

FIG. 12 and FIG. 13 show a third embodiment of the present invention. According to this embodiment, micro servers 45, 46 are provided respectively between a database server 3 and a network 5, and between the network 5 and each of client machines 4, and data transmission is made via these micro servers 45, 46.

The micro servers 45, 46 each includes, as in a common server, a central processing unit, storage device and a data input-output device capable of inputting and outputting data to and from the database server 3 and the network 5. Further, as shown in FIG. 13, the micro servers 45, 46 are provided with the retrieval data processing means 9, retrieval data processing means 15 respectively, and the data reception-transmission processing means 8, 12 respectively, that have been described in the first embodiment.

The retrieval data processing means 9 and the data reception-transmission processing means 8 process data following the same steps as shown in FIG. 5. Likewise, the retrieval data processing means 15 and the data reception-transmission processing means 12 process data following the same steps as shown in FIG. 6.

According to the present embodiment, the data transmission method according to the present invention can be performed with the conventional system, without requiring any change in hardware or software. Therefore, no additional burden is placed on the database server 3 nor the client machine 4. Nor is there inconvenience caused by memory shortage in the database server 3 or the client machine 4.

Figure 14:
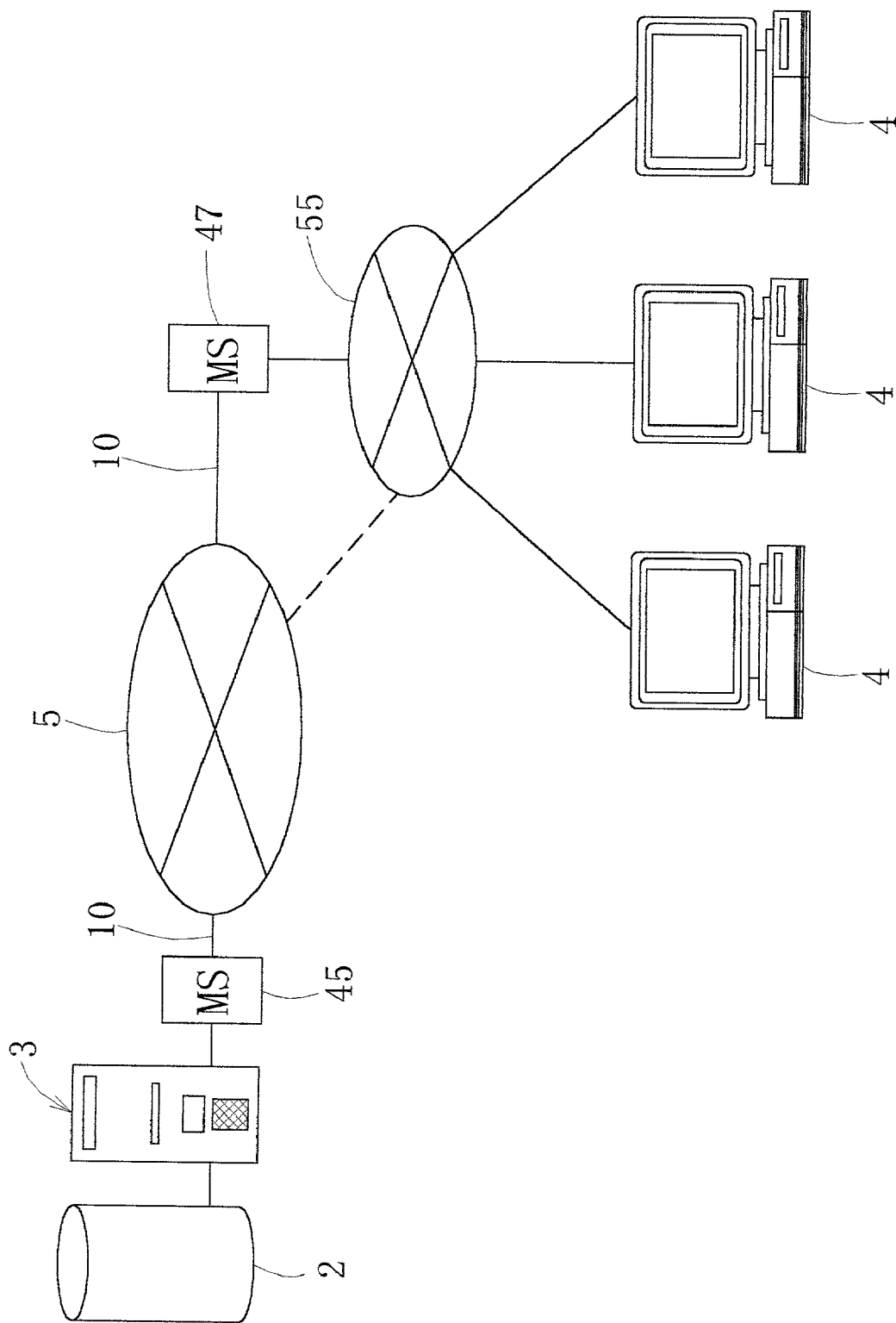
FIG. 14 is a diagram showing a hardware configuration of a fourth embodiment of the present invention.

FIG. 14 shows a fourth embodiment of the present invention. According to this embodiment, a micro server 45 is provided between a database server 3 and a network 5, and at the same time, a plurality of client machines 4 are connected with a micro server 47 via a network 55, and this micro server 47 is connected with the network 5. The network 5 is a wide-area network such as Internet, whereas the network 55 is a network in a limited area such as a LAN. The micro server 45 has equivalent function as the one shown in FIG. 13. The micro server 47 has equivalent function as the one shown in FIG. 13, and further, has function to handle the plurality of client machines. The micro servers 45, 47 perform data transmission in the same method as in the above-described embodiment.

In the present embodiment, the data transmission method according to the present invention can be applied to a plurality of client machines 4 by adopting a pair of micro servers 45, 47. Therefore, cost of introduction can be reduced. Further, no change is required of the database server 3 or the client machines 4 in terms of hardware or software, and effect can be very high especially if data transmission speed in the wide-area network 5 such as Internet is low.

As has been described, according to the data transmission method provided by the present invention, data obtained by database retrieval is first stored as the data attribute table and the retrieval data table, in a memory area, and then information in all items of the tables is connected into the transmission data in the form of a single string of serial data, and this transmission data can be transmitted in a single cycle of transmission procedure. Therefore, transmission time can be dramatically reduced.

Also, by compressing the single-string data, size of the transmission data itself can be reduced and the time for the data transmission can be further reduced.

As a result, even in such a case as the communication link has a narrow bandwidth or the link is heavily loaded, response time in the database retrieval can be dramatically reduced.

Further, the database retrieval can be made without changing the conventional method of retrieval or means of communication. Therefore, the database retrieval can be made in exactly the same operation as used in the conventional database retrieval.

The present invention is not limited to the embodiments described above. For example, in the embodiments, communication means using the TCP/IP protocol is adopted as the data reception-transmission means 8. Alternatively, the communication means may use another protocol.

Also, according to the embodiments, the present invention is applied to the retrieval data processing means 9 provided as a middleware between the data reception-transmission processing means 8 and the retrieval processing means 7. Alternatively, application may be made as a program integrated with the data reception-transmission processing means 8 or the retrieval processing means 7. Further, application may be made as a comprehensive database retrieval program integrated with the data attribute table generating means 17 incorporated the database server 3 and the data reception-transmission processing means 8.

Further, according to the embodiments, data transmission is made via the communication link 10 and Internet as a wide-area network. However, the present invention can also be applied to a database server and clienant system interconnected by an in-house LAN.

Further, according to the embodiment, the transmission method according to the present invention is applied to transmission of a retrieval data table consisting only of text data. However, the present invention can also be applied to transmission of a retrieval data table containing data items of a different data characteristic such as image, sound and so on.

Still further, according to the embodiments, the retrieval command is transmitted in the same method as in the transmission of the retrieval data table. However, the retrieval command may be transmitted to the server in the same transmission method as used in the conventional database.

The invention claimed is:

1. A data transmission method between a server incorporating a database therein and a client machine interlinked via a network, data as in a table format retrieved from the database based on a retrieval command from the client machine being transmitted from the database server to the client machine, the method comprising:

a data table generating step of generating a retrieval data table containing the retrieved data and a data attribute table containing attribute information of the retrieved data, in a memory area on a server side;

a transmission data generating step of serializing all items contained in the data attribute table and retrieval data table into a single string without adding additional information between the items;
a control information adding step of adding control information corresponding to the transmission data, to a head of the transmission data;
a data transmitting step of transmitting the transmission data generated in the transmission data generating step, to the client machine;
a data table regenerating step of regenerating the data attribute table and the retrieval data table in a memory area on the client side, from the transmission data transmitted; and
a data reading step of reading required data from the regenerated data attribute table and retrieval data table.

2. The data transmission method according to claim 1, further comprising: a data compressing step on the server side, of compressing the serialized transmission data and including information on a method of the compression in the control information; and
a data decompressing step on the client side, of decompressing the received data for generation of the transmission data.

3. The data transmission method according to claim 1, further comprising: a compression determining step of determining whether or not the transmission data is to be compressed, in accordance with the data characteristic of the transmission data; and
A data compression step of compressing the transmission data and including information on a method of the compression in the control information, if the compression determining step determines for the compression.

4. The data transmission method according to claim 1, wherein all of the items contained in the data table extracted from the database and all of the items contained in the data attribute table are provided by text data.

5. The data transmission method according to claim 1, wherein an item in the retrieval data table extracted from the database contains data other than text data.

6. The data transmission method according to claim 1, further comprising:
a retrieval command generating step performed on the client machine, of generating a serialized retrieval command; and
a retrieval command data transmitting step of transmitting the retrieval command data to the server; and
a retrieval command regenerating step performed on the server side, of converting the retrieval command data into a retrieval command that performs the database retrieval.

7. A database retrieval method, between a micro server and a main server interconnected via a communication link, the micro server receiving a retrieval command from a plurality of client machines, the main server incorporating a database, the retrieval command being forwarded via the micro server, data as in a table format retrieved from the database being forwarded to the client machine via the micro server, the method comprising:
steps performed on the main server side, of generating and storing in a memory area an extracted retrieval data table and a data attribute table containing description on data attribute of the retrieval data table, of serializing all items in the retrieval data table and data attribute table into a single string of transmission data without adding additional information between the items, of adding control information corresponding to the transmission data, to a head of the transmission data, and forwarding to the micro server; and steps performed on the client side, of regenerating from the transmission data and storing in a memory area the data attribute table and the retrieval data table, of reading required data from the data attribute table and the retrieval data table, and of forwarding the read data to the client machine that issued the retrieval command.

8. The database retrieval method according to claim 7, wherein the micro server generates and forwards a serialized retrieval command data made from the retrieval command sent by the client machine, and the main server converts the forwarded retrieval command data into a retrieval command thereby executing the database retrieval.

9. A data transmission method in a database system where a plurality of servers each incorporating a database are interconnected via a communication link, data as in a table format being transmitted between the servers, the method comprising:
steps performed in one of the servers; of generating and storing in a memory area an extracted retrieval data table and a data attribute table containing description on data attribute of the retrieval data table; of serializing the retrieval data table and the data attribute table into a single string of transmission data without adding additional information between the items; of adding control information corresponding to the transmission data, to a head of the transmission data; and of forwarding to another of the servers; and
steps performed in said another server: of regenerating from the transmission data and storing in a memory area the data attribute table and the retrieval data table; of reading required data from the data attribute table and the retrieval data table and performing required processing to the read data.

10. A computer-readable recording medium for application to a server incorporating a database therein and a client machine interconnected via a communication link, the medium storing a program for transmitting data as in a table format that is retrieved from the database at a command from the client machine, to the client machine, characterized in that the program includes:
retrieval data table generating means of generating a retrieval data table extracted by the retrieval, in a memory area;
data attribute table generating means of generating a data attribute table containing description on data attribute of the retrieval data table, in a memory area;
transmission data generating means of serializing items in the data attribute table and retrieval data table into a single string without adding additional information between the items;
data analyzing means of determining application or non-application of a compressing means depending on data attribute of the transmission data.

11. The computer-readable recording medium according to claim 10, characterized in that the medium stores a transmission data processing program including data transmitting means of outputting the transmission data and the control information of the communication link thereby transmitting to the client machine.

12. The computer-readable recording medium according to claim 10, characterized in that the medium stores a transmission data processing program including data compressing means for the serialized transmission data, and decompressing means for the transmission data compressed by the compressing means.

13. The computer-readable recording medium according to claim 10, characterized in that the medium stores one or greater number of data compressing means, and data analyzing means of determining application or non-application of a compressing means selected from the above compressing means depending on data characteristic of the transmission data.

14. The computer-readable recording medium according to claim 10, characterized in that the medium stores a transmission data processing program including:
retrieval command data generating means of generating serializing the retrieval command transmitted from the client machine thereby generating a retrieval command data; and
retrieval command regenerating means of converting the retrieval command data into a retrieval command for execution of the database retrieval.

15. A data transmission apparatus comprising a database-side micro server connected with a database server incorporating a database therein and a client-side micro server connected with a client machine, for exchange of data as in a table format, between the database server and the client machine via a network and the micro servers, wherein database-side micro server includes:
a computing device, a storing device, and a data input-output device capable of inputting and outputting data to and from the database server and the network; a retrieval command generating program of converting a retrieval command data inputted from the client-side micro server into a retrieval command for execution of the database retrieval;
a data table generating program of generating a retrieval data table obtained by the database retrieval, in the storing device;
a data attribute table generating program of generating a data attribute table containing description of data attribute of the retrieval data table, in the storing device;
a transmission data generating program of serializing all items in the retrieval data table and data attribute table into a single string without adding additional information between the items, thereby generating a transmission data;
a control information adding program of adding control information corresponding to the transmission data, to a head of the transmission data;
a data exchange program of exchanging data with the database server; and
a data transmission-reception program for information exchange with the client-side micro server via the network; whereas
the client-side micro server includes:
a computing device, a storing device, and a data input-output device capable of inputting and outputting data to and from the database server and the network;
a retrieval serializing the command data generating retrieval command data program given by the client machine into the retrieval command data;
a data table regenerating program of regenerating, in the storing device, the retrieval data table and the data attribute table from the transmission data and the control information received from the server-side micro server; and
a retrieved data reading program of reading the retrieved data from the regenerated retrieval data table and the data attribute table.

16. The data transmission apparatus according to claim 15, wherein the database-side micro server and the client-side micro server includes a data compression-decompression program including a data compressing program and a decompressing program for the data compressed by the compressing program.

17. The data transmission apparatus according to claim 16, wherein the data compression-decompression program includes
one or greater number of data compressing programs, and
data analyzing means of determining application or non-application of a compressing program selected from the above compressing programs depending on data characteristic of the transmission data.

* * * * *